US012103401B2

(12) United States Patent
Kvist et al.

(10) Patent No.: US 12,103,401 B2
(45) Date of Patent: Oct. 1, 2024

(54) BRAKING SYSTEM AND METHOD OF CONTROLLING SUCH A BRAKING SYSTEM

(71) Applicant: Volvo Truck Corporation, Gothenburg (SE)

(72) Inventors: Roland Kvist, Braås (SE); Tove Audhav, Landvetter (SE); Gordon Ekman, Moheda (SE); Joakim Haegerstam, Vrigstad (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/075,817

(22) Filed: Dec. 6, 2022

(65) Prior Publication Data

US 2023/0182573 A1 Jun. 15, 2023

(30) Foreign Application Priority Data

Dec. 13, 2021 (EP) .................................... 21213977

(51) Int. Cl.
*B60L 1/00* (2006.01)
*B60L 7/00* (2006.01)
(Continued)

(52) U.S. Cl.
CPC ................. *B60L 1/003* (2013.01); *B60L 7/00* (2013.01); *B60L 7/10* (2013.01); *B60W 10/30* (2013.01);
(Continued)

(58) Field of Classification Search
CPC ................ B60W 20/14; B60W 10/30; B60W 30/18127; F02G 5/02; B60L 58/15;
(Continued)

(56) References Cited

U.S. PATENT DOCUMENTS 5,291,960 A * 3/1994 Brandenburg ........ B60W 10/26
 123/41.14
5,727,388 A * 3/1998 Adamides ................ B60K 8/00
 417/418

(Continued)

FOREIGN PATENT DOCUMENTS

| CN | 103112351 A | 5/2013 |
| CN | 209505839 U | 10/2019 |
| WO | 2012128770 A1 | 9/2012 |

OTHER PUBLICATIONS

Extended European Search Report for European Patent Application No. 21213977.8, mailed May 30, 2022, 11 pages.

*Primary Examiner* — Timothy Wilhelm
(74) *Attorney, Agent, or Firm* — Withrow & Terranova, PLLC

(57) ABSTRACT

A braking system for a vehicle at least partially propelled by an electric traction motor electrically connected to an electric power system. The braking system comprises an electric machine configured to be electrically connected to the electric power system, the electric machine comprising a first output shaft and a second output shaft, an air blower controllably connected to the first output shaft by a clutch, the clutch being controllable between an open position in which no power is transmitted from the electric machine to the air blower, and a closed position in which power is transmitted from the electric machine to the air blower, and a fluid pump operatively connected to the electric machine via the second output shaft, wherein the fluid pump is arranged in upstream fluid communication with a fluidly operated member and in downstream fluid communication with a fluid tank.

20 Claims, 4 Drawing Sheets

(51) Int. Cl.
*B60L 7/10* (2006.01)
*B60W 10/30* (2006.01)
*B60W 20/14* (2016.01)
*B60W 30/18* (2012.01)

(52) U.S. Cl.
CPC ...... *B60W 20/14* (2016.01); *B60W 30/18127* (2013.01)

(58) Field of Classification Search
CPC .... B60L 7/00; B60L 50/60; B60L 7/10; B60L 1/003
See application file for complete search history.

(56) References Cited

U.S. PATENT DOCUMENTS

| | | | | |
|---|---|---|---|---|
| 6,170,587 | B1 * | 1/2001 | Bullock | B60K 6/365 |
| | | | | 903/910 |
| 6,554,088 | B2 * | 4/2003 | Severinsky | B60L 58/12 |
| | | | | 180/65.23 |
| 6,651,433 | B1 * | 11/2003 | George, Jr. | F02C 3/00 |
| | | | | 60/614 |
| 7,380,586 | B2 * | 6/2008 | Gawthrop | B60H 1/004 |
| | | | | 62/3.61 |
| 8,505,659 | B2 * | 8/2013 | Favaretto | B60K 25/00 |
| | | | | 180/65.6 |
| 8,620,506 | B2 * | 12/2013 | Kummer | H01M 10/486 |
| | | | | 180/65.21 |
| 8,630,759 | B2 * | 1/2014 | Bauerle | B60L 7/18 |
| | | | | 903/907 |
| 8,851,043 | B1 * | 10/2014 | Coney | F02G 3/00 |
| | | | | 123/197.4 |
| 9,021,808 | B2 * | 5/2015 | Nelson | F02M 26/27 |
| | | | | 60/605.2 |
| 9,108,514 | B2 * | 8/2015 | Kunz | B60L 7/18 |
| 9,126,580 | B2 * | 9/2015 | Macfarlane | B60W 10/30 |
| 9,205,839 | B2 * | 12/2015 | Lennevi | B60L 7/16 |
| 9,346,464 | B2 * | 5/2016 | Gilbert | B60W 10/06 |
| 9,567,922 | B2 * | 2/2017 | Löfgren | F02B 33/40 |
| 9,586,485 | B2 * | 3/2017 | Badger | B60L 1/003 |
| 9,810,129 | B2 * | 11/2017 | Zhou | F02B 37/10 |
| 9,855,835 | B1 * | 1/2018 | Sneddon | B60K 6/12 |
| 9,878,703 | B2 * | 1/2018 | Kava | B60K 6/48 |
| 9,885,248 | B2 * | 2/2018 | Erämaa | F02C 5/12 |
| 10,118,493 | B2 * | 11/2018 | Nada | B60L 7/12 |
| 10,358,025 | B2 * | 7/2019 | Davydov | B60W 10/08 |
| 10,392,018 | B1 * | 8/2019 | Rhodes | B60L 58/25 |
| 10,544,753 | B2 * | 1/2020 | Filippone | F02G 5/02 |
| 10,625,730 | B2 * | 4/2020 | McCullough | B60W 10/30 |
| 10,746,291 | B2 * | 8/2020 | Xu | F02D 29/02 |
| 10,913,444 | B2 * | 2/2021 | Zhou | B60L 50/13 |
| 10,926,610 | B2 * | 2/2021 | Schumacher | B60H 1/00428 |
| 10,994,589 | B2 * | 5/2021 | Takeuchi | B60H 1/00921 |
| 11,065,936 | B2 * | 7/2021 | Gonze | B60H 1/00899 |
| 11,097,716 | B2 * | 8/2021 | Robison | B60W 10/026 |
| 11,203,342 | B2 * | 12/2021 | Kattoju | B60W 10/08 |
| 11,283,088 | B2 * | 3/2022 | Seo | B28D 7/106... |

| | | | | |
|---|---|---|---|---|
| 10,118,493 | B2 * | 11/2018 | Nada | B60L 7/12 |
| 10,358,025 | B2 * | 7/2019 | Davydov | B60W 10/08 |
| 10,392,018 | B1 * | 8/2019 | Rhodes | B60L 58/25 |
| 10,544,753 | B2 * | 1/2020 | Filippone | F02G 5/02 |
| 10,625,730 | B2 * | 4/2020 | McCullough | B60W 10/30 |
| 10,746,291 | B2 * | 8/2020 | Xu | F02D 29/02 |
| 10,913,444 | B2 * | 2/2021 | Zhou | B60L 50/13 |
| 10,926,610 | B2 * | 2/2021 | Schumacher | B60H 1/00428 |
| 10,994,589 | B2 * | 5/2021 | Takeuchi | B60H 1/00921 |
| 11,065,936 | B2 * | 7/2021 | Gonze | B60H 1/00899 |
| 11,097,716 | B2 * | 8/2021 | Robison | B60W 10/026 |
| 11,203,342 | B2 * | 12/2021 | Kattoju | B60W 10/08 |
| 11,283,088 | B2 * | 3/2022 | Seo | H01M 8/04074 |
| 11,312,258 | B2 * | 4/2022 | Saborit | H02K 11/0094 |
| 11,312,358 | B2 * | 4/2022 | Yui | B60W 10/08 |
| 11,377,090 | B2 * | 7/2022 | Blue | B60K 6/48 |
| 11,535,238 | B2 * | 12/2022 | Zhang | B60W 10/08 |
| 11,541,719 | B1 * | 1/2023 | Richardson | B60H 1/00485 |
| 11,584,242 | B2 * | 2/2023 | Dalum | B60L 58/22 |
| 11,670,443 | B2 * | 6/2023 | Wang | H01F 27/12 |
| | | | | 336/57 |
| 11,728,658 | B2 * | 8/2023 | Guo | H02J 3/30 |
| | | | | 700/297 |
| 11,794,588 | B2 * | 10/2023 | Bolger | B60L 15/2072 |
| 11,833,902 | B2 * | 12/2023 | Narula | B60K 6/32 |
| 2005/0266293 | A1 * | 12/2005 | Delzanno | F01D 15/02 |
| | | | | 429/513 |
| 2006/0046895 | A1 * | 3/2006 | Thacher | B60L 58/40 |
| | | | | 477/4 |
| 2008/0097661 | A1 | 4/2008 | Moran | |
| 2014/0332179 | A1 * | 11/2014 | Vandike | F28D 7/106 |
| | | | | 165/42 |
| 2017/0072813 | A1 | 3/2017 | Martin et al. | |
| 2017/0259806 | A1 | 9/2017 | Kava et al. | |
| 2017/0260889 | A1 * | 9/2017 | Zhou | F02B 39/12 |
| 2020/0207217 | A1 * | 7/2020 | Brandenstein | B60L 50/53 |
| 2021/0001703 | A1 * | 1/2021 | Narula | B60K 6/46 |
| 2021/0140391 | A1 * | 5/2021 | Huscher | F02B 39/085 |
| 2022/0297545 | A1 * | 9/2022 | Tabata | B60K 17/3467 |
| 2023/0001761 | A1 * | 1/2023 | Park | B60L 58/34 |
| 2023/0033135 | A1 * | 2/2023 | Hair | B60K 6/28 |
| 2023/0126729 | A1 * | 4/2023 | Rahm | B60L 1/02 |
| | | | | 701/22 |
| 2023/0158891 | A1 * | 5/2023 | Rahm | B60L 7/10 |
| | | | | 318/376 |

* cited by examiner

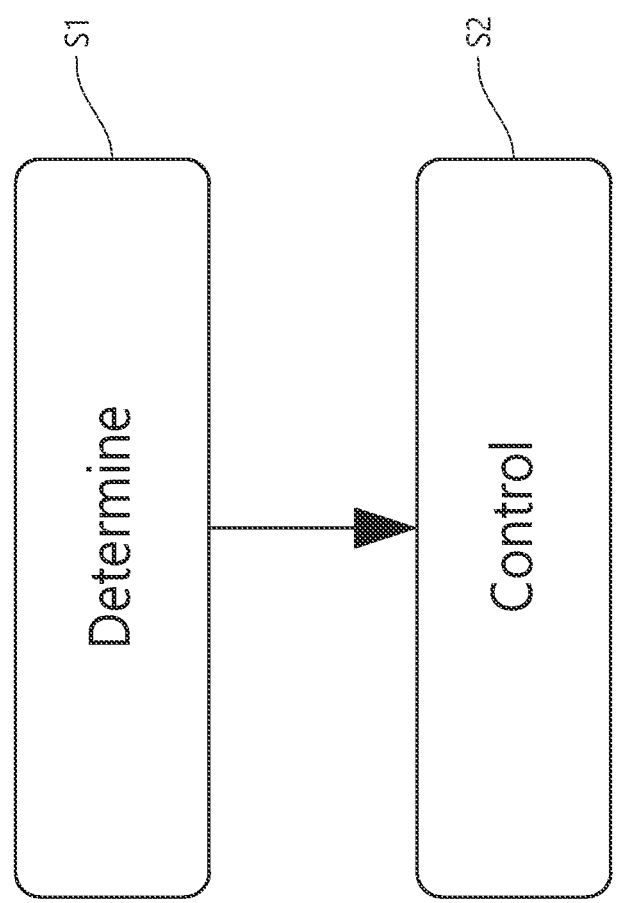

BRAKING SYSTEM AND METHOD OF CONTROLLING SUCH A BRAKING SYSTEM

RELATED APPLICATIONS

The present application claims priority to European Patent Application No. 21213977.8, filed on Dec. 13, 2021, and entitled "BRAKING SYSTEM AND METHOD OF CONTROLLING SUCH A BRAKING SYSTEM," which is incorporated herein by reference in its entirety.

TECHNICAL FIELD

The present invention relates to a braking system for a vehicle at least partially propelled by an electric traction motor. The electric traction motor is preferably electrically connected to an electric power system of the vehicle. The present invention also relates to a method of controlling such a braking system. Although the invention will mainly be directed to a vehicle in the form of a truck using an electric traction motor propelling the vehicle, the invention may also be applicable for other types of vehicles at least partially propelled by an electric traction motor, such as e.g. an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

In comparison to a vehicle propelled solely by an internal combustion engine (ICE), a vehicle propelled by an electric traction motor conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of e.g. a fuel cell electric vehicle (FCEV) as well as a battery electric vehicle (BEV) is a limiting factor.

The reason is that for such type of vehicles, the auxiliary braking places a lot of energy in the cooling system.

There is thus a desire to provide a means for improving the dissipation of electric power when e.g. the vehicle battery is fully charged, i.e. when the so-called state-of-charge level is above a predetermined threshold limit.

SUMMARY

It is thus an object of the present invention to at least partially overcome the above described deficiencies.

According to a first aspect, there is provided a braking system for a vehicle at least partially propelled by an electric traction motor electrically connected to an electric power system, the braking system comprising an electric machine configured to be electrically connected to the electric power system, the electric machine comprising a first output shaft and a second output shaft, an air blower controllably connected to the first output shaft by a clutch, the clutch being controllable between an open position in which no power is transmitted from the electric machine to the air blower, and a closed position in which power is transmitted from the electric machine to the air blower, and a fluid pump operatively connected to the electric machine via the second output shaft, wherein the fluid pump is arranged in upstream fluid communication with a fluidly operated member and in downstream fluid communication with a fluid tank.

The wording "power is transmitted from the electric machine to the air blower" should be construed as transmittal of a force or a torque from the electric machine to the air blower. Moreover, the fluidly operated member should be construed as an arrangement/component/device of the braking system which is operated by means of a fluid. As a non-limiting example, the fluidly operated member may be a fluidly operated cylinder, such as e.g. a hydraulic or pneumatic cylinder. Other arrangements/components/devices are of course also conceivable. Hence, according to an example embodiment, the fluid pump may be a hydraulic pump.

Furthermore, the wording "operatively connected to" should be construed as always connected to. In further detail, the fluid pump and the electric machine are connected to each other by means of the second output shaft without the use of e.g. a clutch or the like. Thus, the fluid pump and the electric machine are not disconnectable from each other, and the fluid pump is operated when the electric machine generates a rotation on the second output shaft. Thus, and in a similar vein, the wording "controllably connected to" should be construed such that the air blower can be disconnected from the electric machine, which is made by controlling the above described clutch.

Moreover, the air blower should be construed as an arrangement which is able to supply a flow of air, preferably ambient air, through a conduit. Preferably, the air blower is configured to also pressurize the air. According to an example embodiment, the air blower may be an air compressor. Other alternatives are also conceivable, such as e.g. an air fan.

The present invention is based on the insight that a fluid pump as well as an air blower can be operated by means of electric power preferably generated during auxiliary braking of the vehicle. Accordingly, the present invention is particularly beneficial for vehicle provided with fluidly operated members which can hereby receive pressurized fluid from the fluid pump. An advantage is hereby that a combined system is provided, which system comprises both an air blower configured to generate a flow of heated and pressurized air, as well as a fluid system configured to generate pressurized fluid to the fluidly operated member. Accordingly, and according to an example embodiment, the electric traction motor and the electric power system may form part of the braking system. The fluid system can thus be operated to add retardation performance for the braking system. Hereby, a more compact solution is provided compared to a solution where e.g. the fluid system is arranged as a separate system. The below detailed description will present a number of various operating modes for operating the braking system.

According to an example embodiment, the electric machine may be configured to dissipate electric power from the electric power system by rotation of the first and second output shafts.

The wording "dissipate electric power" should be construed such that the electric machine is operated by electric power that cannot be received by the electric power system, for example when the state of charge (SOC) level of a battery is above a predetermined threshold limit. The electric machine may also dissipate electric power when there, for some other reason, is a desire not to generate electric power to e.g. a battery of the electric power system.

An advantage is thus that when the electric power system is unable to receive electric power, or when there is a desire not to supply electric power to the electric power system, electric power can instead be used for operating the electric machine, thereby efficiently dissipating excess electric power.

According to an example embodiment, the electric machine may be configured to dissipate electric power from the electric power system by controlling the clutch to assume the closed position for transmitting power from the electric machine to the air blower. Hereby, the electric machine operates the air blower to generate a flow of pressurized and heated air. The pressurized and heated air can subsequently be directed to a position/component of the vehicle in need of an increased temperature.

According to an example embodiment, the fluid tank may be arranged in downstream fluid communication with the fluidly operated member. The fluid tank is hereby configured to receive fluid from the fluid power consumer.

According to an example embodiment, the braking system may further comprise a heat exchanger in fluid communication between the fluidly operated member and the fluid tank. An advantage is that heat from the relatively warm fluid directed between the fluidly operated member and the fluid tank can be used for heating various auxiliaries of the vehicle.

According to an example embodiment, the braking system may further comprise a control unit connected to the electric machine, the clutch, the fluid pump, and the fluid tank.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the control unit may comprise control circuit configured to receive a signal indicative of a regenerative braking operation of the electric traction motor, and transmit a control signal to the electric power system, the control signal representing instructions which, when executed by the electric power system, cause the electric power system to supply electric power to the electric machine for operating the electric machine to generate power in the form of a torque to the second output shaft.

The regenerative braking operation should be construed as an operation in which the electric traction motor is operated as a generator. Hence, the electric traction motor generates electric power while the vehicle speed is controlled. The generated electric power can be supplied to e.g. an energy storage system of the electric power system and/or, as described above, be supplied to the electric machine for operating the electric machine to generate a torque to the second output shaft. The regenerative braking operation should thus not be construed as an operation in which an energy storage system is necessarily regenerated with electric power. An advantage is thus, as also indicated above, that the electric machine is operable to dissipate electric power, which power is used for operating the fluid pump.

According to an example embodiment, the control circuitry may be further configured to determine a level of the power generated by the electric machine, compare the power level with a power level capacity of the fluid pump, and control the clutch to assume the open position when the power level generated by the electric machine is below the power level capacity of the fluid pump. Hereby, when the power, e.g. the torque, generated by the electric machine is within the power level capacity of the fluid pump, only the fluid pump is operated by the electric machine.

On the other hand, and according to an example embodiment, the control circuitry may be further configured to control the clutch to assume the closed position when the power level generated by the electric machine is above the power level capacity of the fluid pump. By arranging the clutch in the closed position, the power generated by the electric machine is split between the first and second output shafts. Thus, the fluid pump is controlled to generate a flow of pressurized fluid to the fluidly operated member, while the air blower at the same time is controlled to generate a flow of pressurized and heated air.

According to an example embodiment, the control circuitry may be further configured to receive a signal indicative of a fluid pressure level of the fluid tank, compare the fluid pressure level with a predetermined threshold limit, and control the clutch to assume the closed position and control a fluid displacement position of the fluid pump to be reduced towards zero displacement when the fluid pressure level is above the predetermined threshold limit.

Hereby, when the fluid tank is at, or approaching, a maximum allowable limit of fluid pressure, the fluid pump is controlled to not supply further pressurized fluid to the fluidly operated member and electric power is dissipated by means of a torque being provided to the first output shaft by arranging the clutch to assume the closed position.

According to an example embodiment, the control unit may comprise control circuitry configured to receive a signal indicative of a fluid pressure level of the fluid tank, compare the fluid pressure level with a predetermined threshold limit, and when the fluid pressure level is below the predetermined threshold limit: transmit a control signal to the electric power system, the control signal representing instructions which, when executed by the electric power system, cause the electric power system to supply electric power to the electric machine for operating the electric machine to generate power in the form of a torque to the second output shaft, and control the clutch to assume the open position.

The pressure level of the fluid tank can hereby efficiently increase to a desirable pressure level.

According to a second aspect, there is provided a method of controlling a braking system for a vehicle, the braking system comprising an electric traction motor for propelling the vehicle, an electric power system connected to the electric traction motor for supplying power to the electric traction motor and to receive electric power generated by the electric traction motor during braking, the braking system further comprising an electric machine electrically connected to the electric power system, an air blower connectable to the electric machine, and a fluid pump operatively connected to the electric machine, the method comprising the steps of determining that the electric traction motor is operated in a braking mode for generating electric power, and controlling the electric power system to supply electric power to the electric machine for operating the electric machine to generate power to the fluid pump.

Effects and features of the second aspect are largely analogous to those described above in relation to the first aspect.

According to a third aspect, there is provided a vehicle, comprising an electric traction motor configured to propel the vehicle, an electric power system electrically connected to the electric traction motor, and a braking system according to any one of the embodiments described above in relation to the first aspect, wherein the electric power system is electrically connected to the electric machine.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein:

FIG. 4 is flow chart of a method of controlling the braking system in FIGS. 2 and 3 according to an example embodiment.

DETAILED DESCRIPTION

Figure 1:
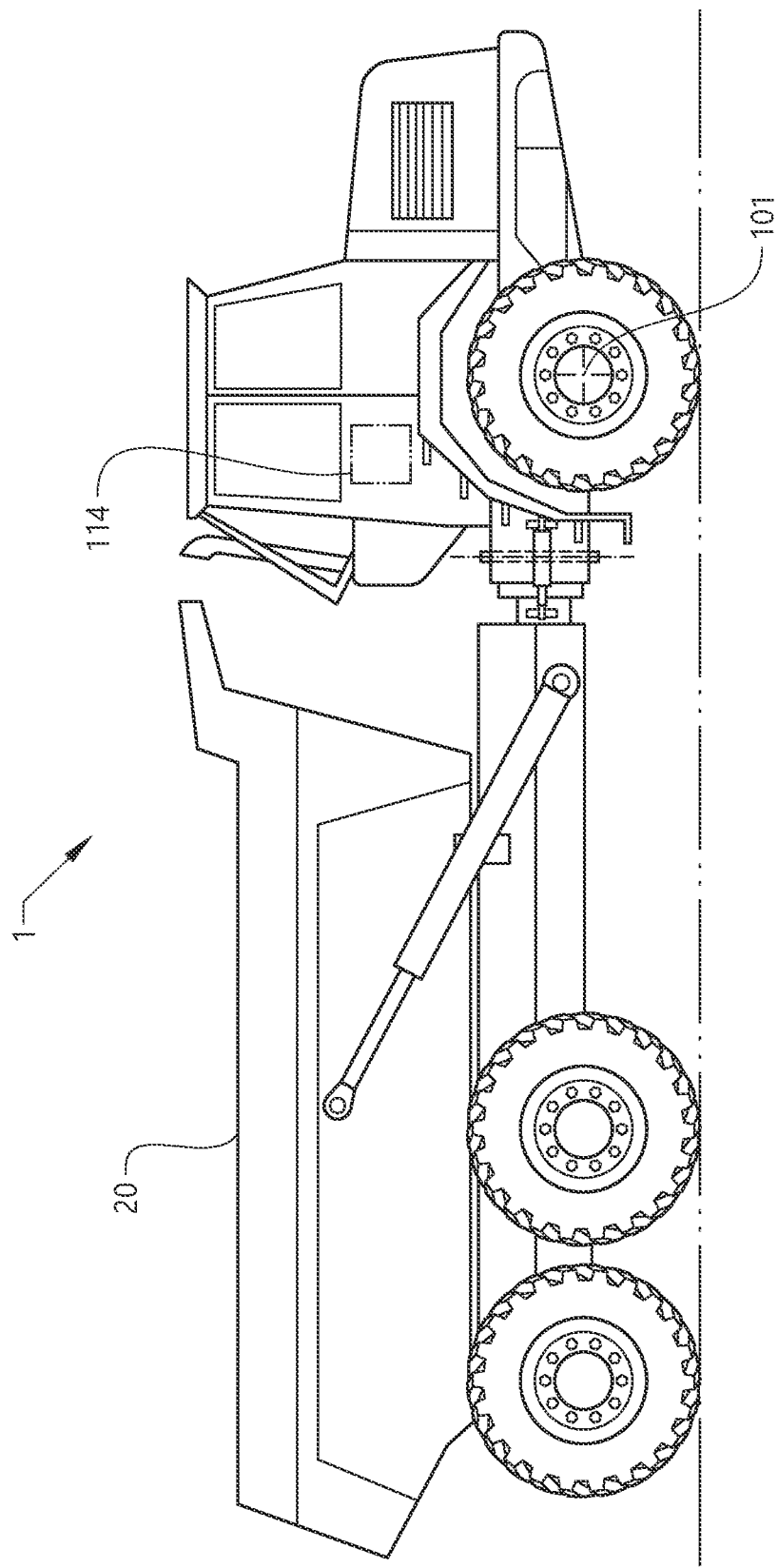
FIG. 1 is a lateral side view illustrating an example embodiment of a vehicle in the form of an articulate hauler.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 in the form of a working machine. The working machine is exemplified as an articulated hauler. The working machine 1 comprises a load implement body 20. In the FIG. 1 example, the load implement body 20 is a dump body. The load implement body 20 comprises an open box which is configured to receive a load material, such as e.g. rock fragments, gravel, sand, and the like. Thus, the working machine 1 is arranged to carry material of various kind to different loading and unloading positions. The working machine 1 is preferably propelled by means of at least one electric traction motor 101.

The working machine 1 is further provided with a control unit 114. The control unit 114 is configured to control various functionalities of the working machine 1 and forms part of the below described braking system.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Figure 2:
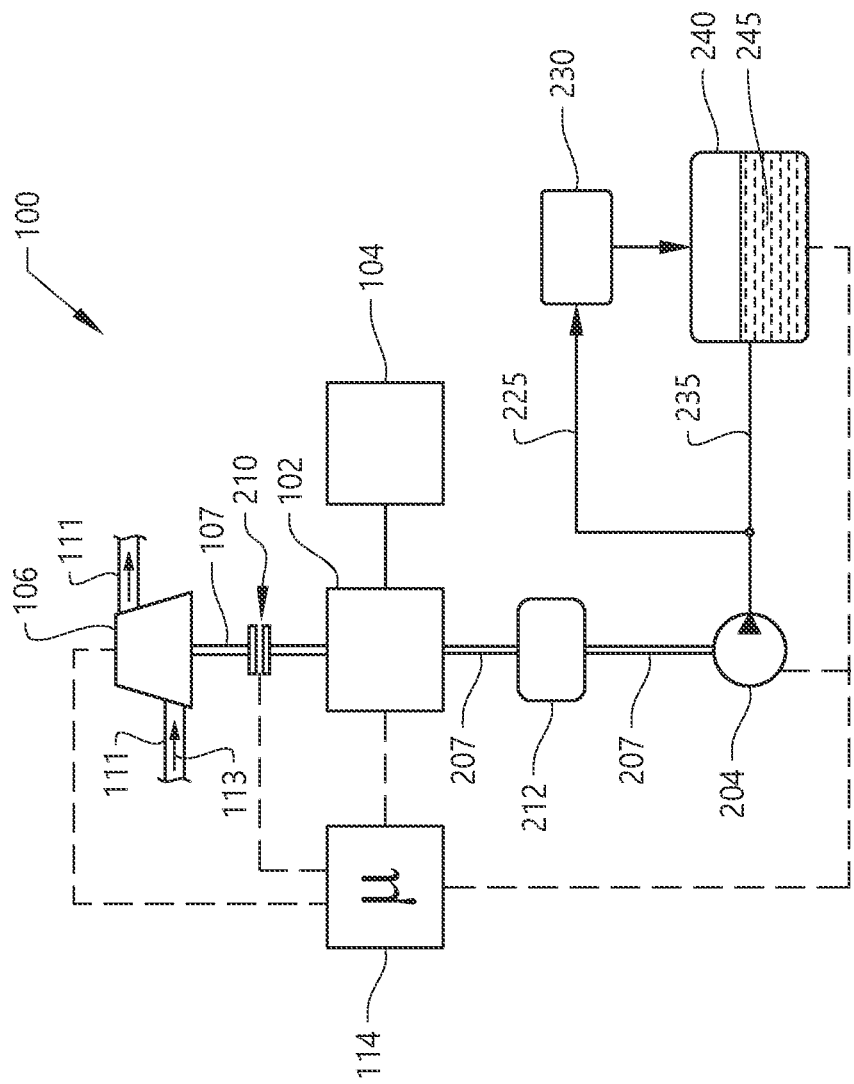
FIG. 2 is a schematic illustration of a braking system according to an example embodiment.

In order to describe the braking system in further detail, reference is now made to FIG. 2 which is a schematic illustration of the braking system 100 according to an example embodiment. The braking system 100 may preferably be operated as an auxiliary braking system as will be evident from the below disclosure. As can be seen in FIG. 2, the braking system 100 comprises an electric machine 102 which is electrically connected to an electric power system 104. The electric machine 102 thus receives electric power from the electric power system 104 for operating the electric machine 102. As will be evident from the below description of FIG. 3, the electric power system 104 preferably comprises an energy storage system. Preferably, the energy storage system is a vehicle battery.

Furthermore, the electric machine 102 comprises a first output shaft 107 and a second output shaft 207. The first output shaft 107 is arranged between the electric machine 102 and an air blower 106. The air blower 106 is preferably an air compressor 106 and will in the following be referred to as such. The air compressor 106 is arranged in a conduit 111 and arranged to receive and pressurize ambient air 113. In detail, the received air 113 is pressurized by the air compressor 106 and supplied further through the conduit 111 downstream the air compressor 106. The air compressor 106 is connected to, and operable by, the electric machine 102. As illustrated in FIG. 2, the first output shaft 107 comprises a clutch 210 between the electric machine 102 and the air compressor 106. The clutch 210 is controlled, by means of receiving a control signal from the control unit 114, between an open position in which no power is transmitted from the electric machine 102 to the air compressor 106, i.e. the air compressor 106 is disconnected from the electric machine 102, and a closed position in which power is transmitted from the electric machine 102 to the air compressor 106, i.e. the air compressor 106 is connected to the electric machine 102. In further detail, the air compressor 106 is operated by rotation of the output shaft 107 when the clutch 210 assumes the closed position, which rotation is generated by operating the electric machine 102.

Moreover, the second output shaft 207 is operatively connected to a fluid pump 204. The fluid pump 204 is preferably a hydraulic pump and will in the following be referred to as such. The hydraulic pump 204 may preferably be arranged in the form of a hydraulic displacement pump. The second output shaft 207 is thus arranged between the electric machine 102 and the hydraulic pump 204. During operation of the electric machine 102, the second output shaft 207 is continuously rotated, thereby providing a rotation on the hydraulic pump 204. According to the exemplified embodiment of FIG. 2, a transmission arrangement 212 may be provided between the electric machine 102 and the hydraulic pump 204. The transmission arrangement 212 may preferably be arranged as a reduction gear for reducing the rotational speed of the second output shaft 207.

Still further, the braking system 100 comprises a fluidly operated member 230 in downstream fluid communication with the hydraulic pump 204. The fluidly operated member 230 is a device that uses fluid, preferably hydraulic fluid, for its operation. As an example, the fluidly operated member 230 may be a hydraulically operated cylinder. The fluidly operated member 230 thus configured to receive pressurized hydraulic fluid from the hydraulic pump 204. Also, the braking system 100 comprises a fluid tank 240 configured to contain a fluid 245. Preferably, the fluid tank 240 is preferably a hydraulic tank and the fluid is thus preferably a hydraulic fluid 245. The fluid tank 240 is arranged in downstream fluid communication with the fluidly operated member 230. The fluid tank 240 is also arranged in upstream fluid communication with the hydraulic pump 204. Accordingly, the fluid tank 240 receives a flow of fluid from the fluidly operated member 230 and supplies a flow of fluid to the hydraulic pump 204.

As can be seen in FIG. 2, the control unit 114 is preferably electrically connected to each one of the air compressor 106, the clutch 210, the electric machine 102, the hydraulic pump 204 and the hydraulic tank 240. Hence, the control unit 114 is configured to receive and transmit signals to/from each one of these devices for controlling operation thereof.

Figure 3:
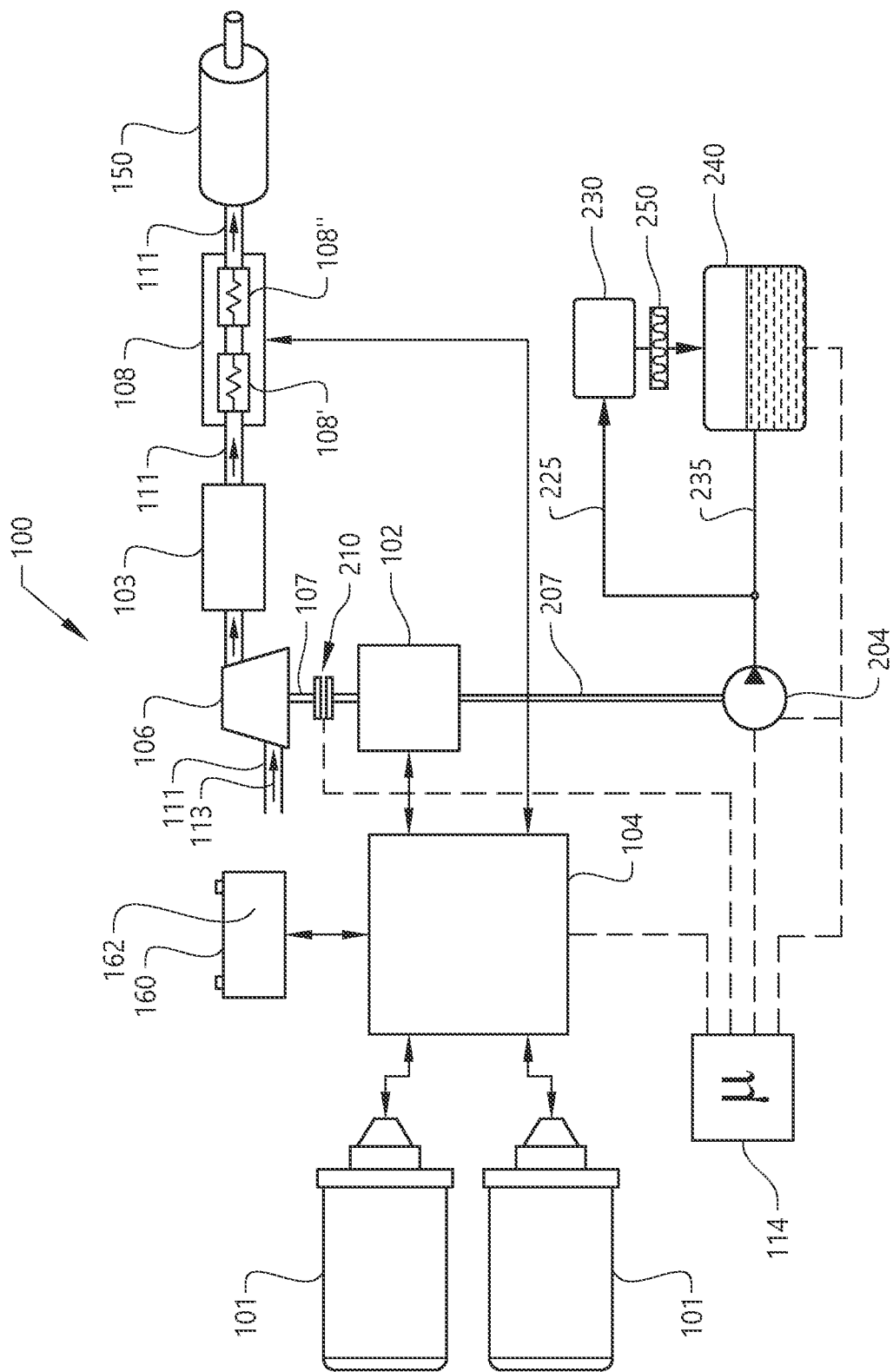
FIG. 3 is a schematic illustration of a braking system according to another example embodiment.

In order to describe the braking system 100 according to another example embodiment, reference is now made to FIG. 3. In particular, the components of the braking system in FIG. 2 are incorporated in the braking system depicted in FIG. 3. Thus, the following will focus on describing the additional components not already described above in relation to FIG. 2.

As can be seen in FIG. 3, the braking system 100 comprises an electric traction motor 101, in FIG. 3 illustrated as a pair of electric traction motors 101. The braking system 100 further comprises the above described electric power system 104 which is connected to the electric traction motor(s) 101 for supply of electric power to the electric power to the electric traction motor(s) 101 when the electric traction motor(s) 101 is/are propelling vehicle 1, and to receive electric power from the electric traction motor(s) 101 when the electric traction motor(s) 101 operates in a regenerative braking mode. In a similar vein as described above, also the FIG. 3 braking system 100 can be referred to as an auxiliary braking system 100.

The electric power system 104 further comprises an electric storage system 160. The electric storage system 160 is preferably arranged in the form of a vehicle battery and will in the following be referred to as a battery 162. The battery 162 is configured to receive electric power generated by the electric traction motor(s) 101 when the electric traction motor(s) 101 operates in the regenerative braking mode. The battery 162 is also arranged to supply electric power to the electric traction motor(s) 101 when the electric traction motor(s) 101 propel the vehicle 1. Although not depicted in FIG. 3, the electric power system 104 may comprise various components, such as traction inverters, brake inverters, a junction box, etc.

The above described control unit 114 is connected to the electric power system 104. The control unit 114 comprises control circuitry for controlling operation of the electric power system. The control unit 114 thus receives data from the electric power system 104, such as e.g. a state-of-charge (SOC) of the battery 162, etc, and transmits control signals to the electric power system 104.

The braking system 100 further comprises the above described electric machine 102 connected to the electric power system 104. As described above, the electric machine 102 is operated by receiving electric power from the electric power system 104. The electric machine 102 is thus arranged as an electric power consumer.

According to the exemplified embodiment in FIG. 3, the braking system 100 further comprises a flow restriction arrangement 103 in the air conduit 111. The flow restriction arrangement 103 is arranged in downstream fluid communication with the air compressor 106 and configured to increase the pressure level of the flow of air exhausted by the air compressor 106. The braking system 100 also comprises an air heating arrangement 108 in the air conduit 111. The air heating arrangement 108 comprises at least one electric air heater 108', 108", in FIG. 3 illustrated as a first electric air heater 108' and a second electric air heater 108". In the following, the air heating arrangement 108 will also be referred to as an electric brake resistor arrangement 108, and the electric air heater(s) will be referred to as electric brake resistors 108', 108".

The electric brake resistor arrangement 108 is arranged in the air conduit 111 in downstream fluid communication with the air compressor 106. The electric brake resistor arrangement 108 is also electrically connected to, and operable by, the electric power system 104. Thus, also the electric brake resistor arrangement 108 is arranged as an electric power consumer. When the electric brake resistor arrangement 108 receives electric power from the electric power system 104, the pressurized air from the air compressor is heated by the at least one brake resistor 108', 108". The pressurized and heated air is thereafter directed towards the ambient environment or other components in need of thermal management. The air from the electric brake resistor arrangement 108 is preferably directed into a muffler 150 of the braking system 100. The muffler 150 reduces noise and can also provide a pressure drop of the air.

Although not depicted in FIG. 3, it should be readily understood that the control unit 114 can be connected to other components in addition to the connection to the electric power system 104. For example, the control unit 114 may be connected to the electric traction motor(s) 101, the battery 162, the electric machine 102, the air heating arrangement 108, as well as connected to an upper layer vehicle control system (not shown).

Moreover, the braking system in FIG. 3 also comprises a heat exchanger 250 arranged between the fluidly operated member 230 and the fluid tank 240.

During operation of the braking system 100, i.e. when the electric traction motor 101 operates as generators to control the vehicle speed, i.e. the vehicle 1 operates in the regenerative braking mode, electric power is transmitted from the electric traction motor 101 to the electric power system 104.

If the battery 162 is not able to receive all, or parts of the electric power generated by the electric traction motor 101, for example because of the current electric charging capacity, i.e. the level of electric power the battery is able to receive until being fully charged, or that the battery has reached its maximum allowed state of charge level, the excess electric power should preferably be dissipated. The following will now describe various operating modes for dissipating the excess electric power, as well as operating modes for operating the braking system also when no electric power is generated by the electric traction motor(s) 101.

According to a first operating mode, when the control unit 114 receives a signal indicating that the electric traction motor(s) 101 is operated to generate electric power, the control unit 114 transmits a control signal to the electric machine 102 for operating the electric machine 102 to rotate the first 107 and second shafts 207. If the level of power level generated by the electric machine 102 is below a power level capacity of the hydraulic pump 204, the clutch 210 should assume the open position. Accordingly, when the power level capacity of the hydraulic pump 204 is higher than the power level generated by the electric machine 102, the hydraulic pump 204 is able to solely handle the torque generated by the electric machine 102. Preferably, a pressure level of the hydraulic tank 240 should be below a predetermined threshold limit when operating the braking system 100 in the first operating mode.

On the other hand, and according to a second operating mode, if the power level generated by the electric machine 102 is above the power level capacity of the hydraulic pump 204 when the electric traction motor(s) 101 is operated to generate electric power, the clutch 210 is controlled to assume the closed position. Hereby, the air compressor 106 is operated to pressurize the flow of air 113 in the conduit 111, while at the same time also operating the hydraulic pump 204. In a similar vein as the first operating mode, the pressure level of the hydraulic tank 240 should be below a predetermined threshold limit when operating the braking system 100 in the second operating mode.

On the other hand, when the pressure level of the hydraulic tank 240 is above the predetermined threshold and the electric traction motor(s) 101 is operated to generate electric power, the braking system should preferably be operated in a third operating mode. In the third operating mode, the clutch 210 is controlled to assume the closed position and a fluid displacement position of the hydraulic pump should be controlled to be reduced towards substantially zero displacement. Thus, in the third operating mode, the air compressor 106 is operated to pressurize the flow of air 113 in the conduit 111 and the second output shaft 207 is rotating but the hydraulic pump 207 does not generate a flow of pressurized fluid to the fluidly operated member 230.

The braking system 100 according to the present invention is also configured to assume a fourth and a fifth operating mode. In each of the fourth and fifth operating modes, the electric traction motor(s) 101 is not operated to generate electric power. The electric traction motor(s) 101 can instead, for example, be arranged to provide a propulsive torque on the wheels of the vehicle 1.

In the fourth operating mode, no electric power is generated by the electric traction motor(s) 101. However, the pressure level in the fluid tank is below a predetermined lower threshold limit and there is a desire to increase the pressure of the fluid tank, i.e. a desire to provide fluid to the fluid tank. The electric machine 102 is hereby controlled to generate a torque and the clutch 210 is arranged to assume the open position. Thus, a torque is generated on the second output shaft 207 by the electric machine such that the hydraulic pump 204 supplies a flow of pressurized fluid to the fluidly operated member 230. The fluidly operated member 230 thereafter supplies a flow of fluid to the fluid tank 240 for increasing the pressure level of the fluid tank 240. When the braking system 100 is operated in the fourth operating mode, the electric machine 102 preferably receives electric power from the battery 162.

Although not depicted in FIGS. 2 and 3, the braking system may also comprise an accumulator. Such accumulator is preferably arranged between the fluid pump 204 and the fluidly operated member 230. In the fourth operating mode, the fluid from the accumulator can thus be used for controlling operation of the fluidly operated member 230 which in turn can supply a flow of fluid to the fluid tank 240 instead of e.g. draining the battery 162 from electric power.

Furthermore, the braking system 100 is operated in the fifth operating mode when the pressure level in the fluid tank 240 is within acceptable levels and the electric traction motor(s) 101 is not operated to generate electric power. In the fifth operating mode, the electric motor 102 is deactivated. Thus, the first 107 and second 207 output shafts are kept stationary.

According to an example embodiment, when the electric traction motor(s) is/are arranged to generate electric power, the control unit 114 can be arranged to determine a level of electric power dissipation for the electric power system 104, i.e. a level of electric power that should be dissipated since it is not suitable to supply such electric power to the battery 162. The level of electric power dissipation is hence a difference between the level of electric power generated during the regenerative braking and the current electric charging capacity of the battery 162. If the electric machine 102 is able to handle, i.e. receive and be operated by, electric power corresponding to the level of electric power dissipation, all excess electric power, i.e. the generated power not being supplied to the battery 162 for charging, is supplied to the electric machine 102, whereby the clutch and hydraulic pump is controlled in a suitable manner according to any one of the above described operating modes.

In order to summarize, reference is now made to FIG. 4 which is a flow chart of operating the above described braking system 100 according to an example embodiment. The FIG. 4 embodiment is applicable for the first, second and third operating modes described above. During operation of the vehicle 1, when the control unit 114 determines Si that the electric traction motor(s) 101 is operated in braking mode for generating electric power. In response to the determination that the electric traction motor(s) 101 is operated in braking mode, the control unit 114 controls the electric power system 104 to supply electric power to the electric machine 102 for operating the electric machine to generate power. Based on the level of power generated by the electric machine 102 as well as the pressure level of the fluid tank 240, the braking system is controlled to be operated in one of the above described first, second or third operating modes.

It is to be understood that the present disclosure is not limited to the embodiments described above and illustrated in the drawings; rather, the skilled person will recognize that many changes and modifications may be made within the scope of the appended claims.

The invention claimed is:

1. A braking system for a vehicle at least partially propelled by an electric traction motor electrically connected to an electric power system, the braking system comprising:
    an electric machine configured to be electrically connected to the electric power system, the electric machine comprising a first output shaft and a second output shaft,
    an air blower controllably connected to the first output shaft by a clutch, the clutch being controllable between an open position in which no power is transmitted from the electric machine to the air blower, and a closed position in which power is transmitted from the electric machine to the air blower, and
    a fluid pump operatively connected to the electric machine via the second output shaft, wherein the fluid pump is arranged in upstream fluid communication with a fluidly operated member and in downstream fluid communication with a fluid tank,
    wherein the fluid tank is arranged in downstream fluid communication with the fluidly operated member.

2. The braking system of claim 1, wherein the electric machine is configured to dissipate electric power from the electric power system by rotation of the first and second output shafts.

3. The braking system of claim 2, wherein the electric machine is configured to dissipate electric power from the electric power system by controlling the clutch to assume the closed position for transmitting power from the electric machine to the air blower.

4. The braking system of claim 1, wherein the braking system further comprises a heat exchanger in fluid communication between the fluidly operated member and the fluid tank.

5. The braking system of claim 1, wherein the braking system further comprises a control unit connected to the electric machine, the clutch, the fluid pump, and the fluid tank.

6. The braking system of claim 5, wherein the control unit comprises a control circuitry configured to:
receive a signal indicative of a fluid pressure level of the fluid tank, and
compare the fluid pressure level with a predetermined threshold limit, and when the fluid pressure level is below the predetermined threshold limit:
transmit a control signal to the electric power system, the control signal representing instructions which, when executed by the electric power system, cause the electric power system to supply electric power to the electric machine for operating the electric machine to generate power in the form of a torque to the second output shaft, and
control the clutch to assume the open position.

7. The braking system of claim 5, wherein the control unit comprises control circuitry configured to:
receive a signal indicative of a regenerative braking operation of the electric traction motor, and
transmit a control signal to the electric power system, the control signal representing instructions which, when executed by the electric power system, cause the electric power system to supply electric power to the electric machine for operating the electric machine to generate power in the form of a torque to the second output shaft.

8. The braking system of claim 7, wherein the control circuitry is further configured to:
receive a signal indicative of a fluid pressure level of the fluid tank,
compare the fluid pressure level with a predetermined threshold limit, and
control the clutch to assume the closed position and control a fluid displacement position of the fluid pump to be reduced towards zero displacement when the fluid pressure level is above the predetermined threshold limit.

9. The braking system of claim 7, wherein the control circuitry is further configured to:
determine a level of the power generated by the electric machine,
compare the power level with a power level capacity of the fluid pump, and
control the clutch to assume the open position when the power level generated by the electric machine is below the power level capacity of the fluid pump.

10. The braking system of claim 9, wherein the control circuitry is further configured to:
control the clutch to assume the closed position when the power level generated by the electric machine is above the power level capacity of the fluid pump.

11. The braking system of claim 1, wherein the fluid pump is a hydraulic pump.

12. The braking system of claim 1, wherein the air blower is an air compressor.

13. A vehicle comprising:
an electric traction motor configured to propel the vehicle,
an electric power system electrically connected to the electric traction motor, and
the braking system of claim 1, wherein the electric power system is electrically connected to the electric machine.

14. A method of controlling a braking system for a vehicle, the braking system comprising an electric traction motor for propelling the vehicle, an electric power system connected to the electric traction motor for supplying power to the electric traction motor and to receive electric power generated by the electric traction motor during braking, the braking system further comprising an electric machine electrically connected to the electric power system, an air blower connectable to the electric machine, and a fluid pump operatively connected to the electric machine, the fluid pump being arranged in upstream fluid communication with a fluidly operated member and in downstream fluid communication with a fluid tank, wherein the fluid tank is arranged in downstream fluid communication with the fluidly operated member, the method comprising:
determining that the electric traction motor is operated in a braking mode for generating electric power, and
controlling the electric power system to supply electric power to the electric machine for operating the electric machine to generate power to the fluid pump.

15. A braking system for a vehicle at least partially propelled by an electric traction motor electrically connected to an electric power system, the braking system comprising:
an electric machine configured to be electrically connected to the electric power system, the electric machine comprising a first output shaft and a second output shaft,
an air blower controllably connected to the first output shaft by a clutch, the clutch being controllable between an open position in which no power is transmitted from the electric machine to the air blower, and a closed position in which power is transmitted from the electric machine to the air blower, and
a fluid pump operatively connected to the electric machine via the second output shaft, wherein the fluid pump is arranged in upstream fluid communication with a fluidly operated member and in downstream fluid communication with a fluid tank,
wherein the braking system further comprises a control unit connected to the electric machine, the clutch, the fluid pump, and the fluid tank;
wherein the control unit comprises a control circuitry configured to:
receive a signal indicative of a regenerative braking operation of the electric traction motor, and
transmit a control signal to the electric power system, the control signal representing instructions which, when executed by the electric power system, cause the electric power system to supply electric power to the electric machine for operating the electric machine to generate power in the form of a torque to the second output shaft; and
wherein the control circuitry is further configured to:
determine a level of the power generated by the electric machine,
compare the power level with a power level capacity of the fluid pump, and
control the clutch to assume the open position when the power level generated by the electric machine is below the power level capacity of the fluid pump.

16. The braking system of claim 15, wherein the control circuitry is further configured to:

control the clutch to assume the closed position when the power level generated by the electric machine is above the power level capacity of the fluid pump.

17. The braking system of claim 15, wherein the control circuitry is further configured to:
    receive a signal indicative of a fluid pressure level of the fluid tank,
    compare the fluid pressure level with a predetermined threshold limit, and
    control the clutch to assume the closed position and control a fluid displacement position of the fluid pump to be reduced towards zero displacement when the fluid pressure level is above the predetermined threshold limit.

18. The braking system of claim 15, wherein the control circuitry is further configured to:
    receive a signal indicative of a fluid pressure level of the fluid tank, and
    compare the fluid pressure level with a predetermined threshold limit, and when the fluid pressure level is below the predetermined threshold limit:
        transmit a control signal to the electric power system, the control signal representing instructions which, when executed by the electric power system, cause the electric power system to supply electric power to the electric machine for operating the electric machine to generate power in the form of a torque to the second output shaft, and
        control the clutch to assume the open position.

19. The braking system of claim 15, wherein the fluid pump is a hydraulic pump.

20. The braking system of claim 15, wherein the air blower is an air compressor.

* * * * *